(12) United States Patent
Yoneda et al.

(10) Patent No.: US 7,014,908 B2
(45) Date of Patent: *Mar. 21, 2006

(54) EL INSERT MOLDING

(75) Inventors: Koji Yoneda, Narashino (JP); Atsushi Saito, Narashino (JP); Yasufumi Naoi, Narashino (JP)

(73) Assignee: SEIKO Precision, Inc., Chiba-ken (JP)

( * ) Notice: Subject to any disclaimer, the term of this patent is extended or adjusted under 35 U.S.C. 154(b) by 64 days.

This patent is subject to a terminal disclaimer.

(21) Appl. No.: 10/271,206

(22) Filed: Oct. 15, 2002

(65) Prior Publication Data

US 2003/0075825 A1    Apr. 24, 2003

(30) Foreign Application Priority Data

Oct. 22, 2001    (JP)    .............................. 2001-323289

(51) Int. Cl.
    *B29C 31/00*    (2006.01)
    *B32B 3/00*    (2006.01)
(52) U.S. Cl. ................... 428/192; 428/195; 428/292.1; 428/411.11
(58) Field of Classification Search ................ 428/690, 428/917, 292.1, 411.1, 192, 195; 313/504, 313/506, 507; 429/917
    See application file for complete search history.

(56) References Cited

U.S. PATENT DOCUMENTS

| | | | | | |
|---|---|---|---|---|---|
| 4,619,624 | A | * | 10/1986 | Kerr et al. ..................... 445/22 |
| 4,917,927 | A | * | 4/1990 | Sakaitani et al. .......... 428/42.1 |
| 5,264,172 | A | * | 11/1993 | Rosica et al. ................ 264/132 |
| 5,336,345 | A | * | 8/1994 | Gustafson et al. ............ 156/67 |
| 5,496,427 | A | * | 3/1996 | Gustafson et al. ............ 156/67 |
| 5,512,226 | A | * | 4/1996 | Rosica et al. ................ 264/132 |
| 6,515,312 | B1 | * | 2/2003 | Chen et al. ................... 257/99 |
| 2003/0075825 | A1 | * | 4/2003 | Yoneda et al. ......... 264/272.11 |

FOREIGN PATENT DOCUMENTS

| JP | 10-249881 | | 9/1998 |
|---|---|---|---|
| JP | 11-162633 | * | 6/1999 |
| WO | 98/49871 | | 11/1998 |

* cited by examiner

*Primary Examiner*—Rena Dye
*Assistant Examiner*—Camie S. Thompson
(74) *Attorney, Agent, or Firm*—Jordan and Hamburg LLP

(57)    ABSTRACT

An end face of a transparent electrode or a backside electrode of an EL element is not bared at an end surface of an outer periphery of an EL insert molding or an end surface of an inner periphery of a through hole portion. A decorative film covers a front side of an EL element and molding resin is injected onto a backside surface of the EL element to form a molding resin portion. An end potion of the decorative film is bent to cover the end portion of the EL element and extends beyond the end portion of the EL element a distance larger than at least a thickness of the EL element.

5 Claims, 1 Drawing Sheet

(a)

(b)

EL INSERT MOLDING

BACKGROUND

The present invention relates to an EL insert molding utilized for a mobile phone, a mobile information terminal, an electric appliance, an industrial equipment, an audio equipment, and an electrical component for automobiles and the like.

In an EL insert molding of a prior art, for example, in a case that the EL insert molding of the prior art has a through hole portion, after a decorative film and an EL element are integrated, die cutting, piercing and so on are done, the integrated decorative film and EL element is inserted into a cavity of an injection molding machine, and the EL insert molding is formed by injecting resin into the cavity.

In the EL element, an electric field of alternating current is applied between a laminated transparent electrode and backside electrode to emit light. However, in the EL element formed by the conventional method described above, an end face of a transparent electrode or a backside electrode is in a bared state an an outer periphery or a through hole portion, the end face of the transparent electrode or the backside electrode short-circuits when a metal frame and the like is disposed on an end portion of the EL element, thereroe there is a danger of of a malfunction of a circuit adjacent to the metal frame and the like. When a coating treatment of the end portion is done in order to prevent the short circuit, the number of processes is increased, which results in a problem of high-cost.

SUMMARY OF THE INVENTION

It is an object of the invention that an end face of a transparent electrode or a backside electrode of an EL element is not bared at an outer periphery or an inner periphery of a through hole portion, an end face of the transparent electrode or a backside electrode of the EL element and does not short-circuit with other members so the EL element does not malfunction due to a short circuit, and low-cost is achieved by simple construction.

An EL insert molding of the invention is characterized in that a decorative film is provided on a surface side, an EL element is provided on a backside of the decorative film, molding resin is injected onto a backside surface of the EL element to form the EL element, an end portion of the decorative film is provided shifted outwardly from an end portion of the EL element, the end portion of the EL element is covered with the end portion of the decorative film in a manner that the end portion of the decorative film is bent into injection molding of the molding resin. Accordingly, the end face of the transparent electrode or the backside electrode of the EL element is not bared, the end face of the transparent electrode or the backside electrode of the EL element does not short-circuit with other members placed outside, the EL element does not malfunction due to the short circuit, and low-cost can be achieved by simple construction.

It is preferable that a difference between the end portion of the decorative film and the end portion of the EL element is larger than at least a thickness of the EL element. It is preferable that the end portion of the decorative film and the end portion of the EL element are an end portion of a periphery of a through hole portion provided in the EL insert molding.

BRIEF DESCRIPTION OF THE DRAWINGS

FIG. 2 is an enlarged view of parts shown in FIG. 1, in which FIG. 2(a) is a cross-sectional view of an embodiment of the invention, and FIG. 2(b) is a cross-sectional view of another embodiment of the invention.

DETAILED DESCRIPTION

A preferred embodiment of the invention will be described below referring to the accompanying drawings.

Figure 1:
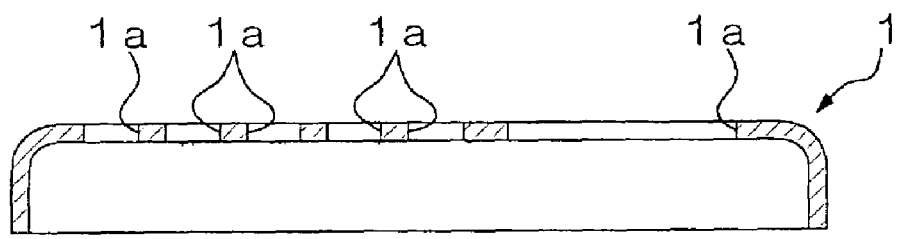
FIG. 1 is a cross-sectional view showing an embodiment of the invention.
Figure 2:
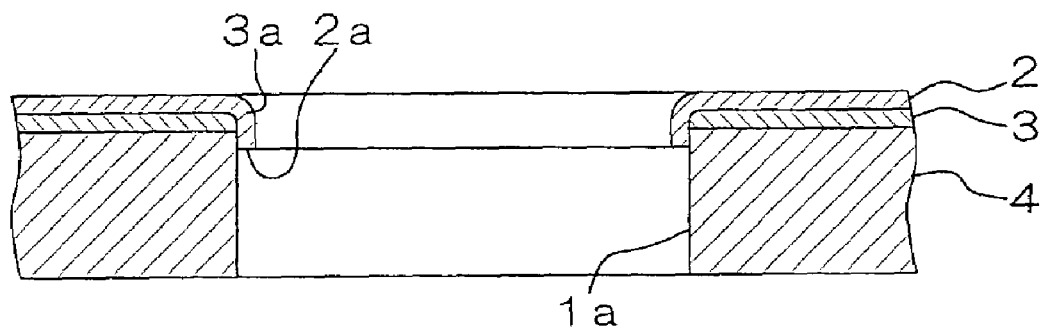
Figure 2:
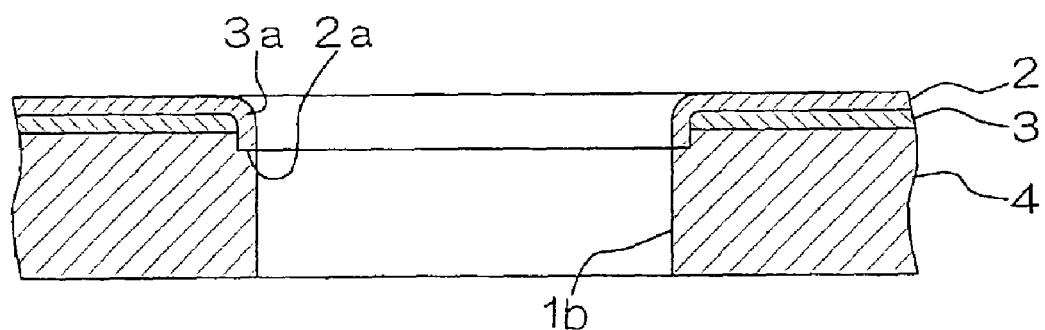

FIG. 1 is a cross-sectional view showing a whole of an EL insert molding 1. For example, a through hole portion 1a, used as the through hole for a liquid crystal display or the through hole for an operating switch, is formed in a front case of a mobile phone as shown in FIG. 1. As shown in FIG. 2, the EL insert molding 1 is manufactured in a manner that a sheet, in which a decorative film 2 and an EL element 3 are integrally provided, is inserted into a cavity of an injection molding machine (not shown), and molding resin is injected into a cavity of a backside surface of the EL element 3 to form a formed resin portion 4.

A structure near the through hole portion 1a in enlarged dimension is shown in FIG. 2(a). First, the decorative film 2 will be described below. In the decorative film 2, a transparent film is formed by a polymer alloy (PC/PBT) including polycarbonate (PC) and polybutylene terephthalate (PBT), a decorative layer drawn by a pattern, an illustration, a character and the like is formed on the transparent film.

The EL element 3 is formed as follows. Indium tin oxide (ITO) is deposited on a polycarbonate substrate film as a transparent electrode, luminous ink is printed on the transparent electrode layer to form a luminous layer, a ferroelectric layer is formed on the luminous layer by the same printing method as the formation of the luminous layer. Carbon ink is printed on the ferroelectric layer to form a back electrode layer. A protection layer is formed on the back electrode layer. An adhesive layer made of a material having good heat resistance and room temperature setting is formed by adhering strongly insert molding resin to the protection layer.

In FIG. 2(a) a through hole portion 3a whose diameter corresponds to the through hole portion 1a is formed in the EL element 3 having such a laminated structure and a through hole portion 2a whose diameter is smaller than that of the through hole portion 3a is formed by the decorative film 2. Though the EL element 3 is adhered to a backside of the decorative film 2 by using a double-sided adhesive tape, there is difference corresponding to a deffierence in the diameter between the through hole portion 3a and the through hole portion 2a at this adhesive state. The difference is set at a larger value than a thickness of the EL element 3, so that an end face of the EL element is surely covered without exposing an end face of the EL element after forming.

The decorative film 2 and the EL element 3 which are adhered integrally are plastically deformed into a desirable shape, for example, a three dimensional shape such as a box shape, and inserted into the cavity of the injection molding machine. A cavity is provided with a pin projected in the cavity in order to form the through hole portion 1a. In this case, for example, a long pin having a diameter corresponding to the through hole portion 1a is provided in a die of a cavity side, a short pin having a diameter smaller than the through hole portion 1*a* by a thickness of the decorative film is provided in a die of a movable side, and both ends of the pins abut each other. When the plastically deformed decorative film 2 and EL element 3 are inserted into the cavity of the die of the movable side, a periphery portion of the through hole 2*a* is bent into the through hole 3*a* of the EL element 3 by the short pin because the decorative film 2 is sufficiently thin. The bent state can be restored to an initial state by taking off from the short pin in case that the bent state is within a range of elastic deformation of the decorative film 2.

Molding resin is injected from a gate portion of the injection molding machine into the cavity of the backside of the EL element 3, a molding resin portion 4 is formed by hardening the resin to produce an EL insert molding. In the injection molding, the bent state in the through hole portion of the decorative film 2 receives thermal stress from the projected molding resin in a manner that the injected molding resin is projected, and the bent state is plastically deformed into a plastically bent state in which the bent state covers the end portion of EL element 3. The plastically bent state is never restored even after mold release. The through hole portion 1*a* is formed by the both pins with the both ends of the pins abutted against each other. In a peripheral surface of the through hole portion 1*a*, the end surfaces of the EL element 3 are sufficiently covered with a peripheral portion of the through hole portion 2*a* of the decorative film 2, accordingly the molding can be produced without exposing the end face of the EL element.

In FIG. 2(*b*), a through hole portion 1*b* formed by the molding resin portion 4 is corresponded to a bent inside surface of the through hole portion of the decorative film 2 in a state which the peripheral portion of the through hole portion 2*a* of the decorative film 2 is bent into the through hole portion 3*a* of the EL element 3. In this case, the pin corresponding to the through hole portion 1*b* is provided in the die of the movable side. In the same way as the above-described case, when the plastically deformed decorative film 2 and EL element 3 are inserted into the cavity of the die of the movable side, a periphery portion of the through hole 2*a* is bent into the through hole 3*a* of the EL element 3 by the pin, because the decorative film 2 is sufficiently thin. Though the bent state is within the range of the elastic deformation like the above-described case, the bent state receives the thermal stress from the projected molding resin and is plastically deformed into a state which the peripheral portion of the through hole portion 2*a* of the decorative film 2 covers the end portion of EL element 3 while the molding resin portion 4 is formed by the injection molding. The through hole portion 1*b* is formed by the pin provided in the die of the movable side, the end surface of the EL element 3 is never exposed in a periphery of the through hole portion 1*b*, accordingly the molding can be produced with the end face of the EL element 3 covered sufficiently with the peripheral portion of the through hole portion 2*a* of the decorative film 2.

In an end face of an outer periphery of the EL insert molding, an end portion of the outer periphery of the EL element 3 is formed smaller than the end portion of the outer periphery of the decorative film 2 by the same difference as the above-described case, the end portion of the outer periphery of the decorative film 2 which projects corresponding to the difference is formed as the end portion of the outer periphery of the decorative film 2 and is bent toward the side of the EL element 3 into the injection molding, which causes the end face of the EL element 3 to be covered with the end portion of the decorative film 2 without exposing the end face of the EL element 3.

As a material forming the decorative film 2, it is preferred to use the material having an elongation at the thermal stress being larger than the elongation of the material for forming the EL element 3 at the thermal stress. That causes the end portion of the EL element 3 to be covered more surely in a manner that the end portion of the decorative film 2 is bent by the thermal stress in the projection molding.

According to the invention, the end portion of the EL element is covered by the end portion of the decorative film in a manner that the end portion of the decorative film is shifted outwardly from the end portion of the EL element and the end portion of the decorative film is bent into the injection molding of the molding resin. Consequently, the end face of the transparent electrode or the backside electrode of the EL element is not bared at the end surface of the outer periphery or the end surface of the inner periphery of the through hole portion, the end face of the transparent electrode or the backside electrode of the EL element does not short-circuit with other members, the EL element does not malfunction due to the short circuit, and low-cost can be achieved by a simple construction. Furthermore, longer lifetime of the EL element can be achieved because the end face of the EL element is covered with the decorative film.

We claim:

1. An EL insert molding comprising:
   an EL element having opposing first and second surfaces, and an edge surface extending a thickness width from said first surface to said second surface;
   a decorative film having a front and a back surface and an edge region, said EL element having said first surface adhered to said back surface, said edge region extending from a bend in said decorative film to an edge of said decorative film in a bending direction to cover said thickness width of said edge surface of said EL element with said back surface; and
   injection molded resin applied to said second surface of said EL element wherein said bending direction extends toward said injection molded resin.

2. The EL insert molding as claimed in claim 1, wherein an edge region width of said edge region is greater than the thickness width of the EL element such that said edge of said edge region extends beyond said second surface of said EL element.

3. The EL insert molding as in either claim 1 or claim 2, said front surface of said decorative film in said edge region defines a periphery of a through hole portion provided in the EL insert molding.

4. The EL insert molding according to claim 3, wherein said injection molded resin has an aperture aligned with said through hole and said edge surface of said EL element is flush with a wall of said aperture.

5. The EL insert molding according to claim 3, wherein said injection molded resin has an aperture aligned with said through hole and said front surface of said decorative film in said edge region is flush with a wall of said aperture.

* * * * *